United States Patent [19]

Minculescu

[11] Patent Number: 5,572,904
[45] Date of Patent: Nov. 12, 1996

[54] OSCILLATION LEVER ARM ENGINE

[76] Inventor: Mihai C. Minculescu, 52 Tamarack Ct., Newtown, Pa. 18940

[21] Appl. No.: 369,153

[22] Filed: Jan. 5, 1995

[51] Int. Cl.$^6$ .............................. F16H 21/34; F02B 75/32
[52] U.S. Cl. ................ 74/45; 92/138; 123/55.5; 123/55.7; 123/197.1
[58] Field of Search .......................... 74/45; 92/68, 138, 92/142; 123/61 R, 63, 55.5, 55.7, 197.1, 197.3, 197.4

[56] References Cited

U.S. PATENT DOCUMENTS 2,392,921  1/1946  Holman ................................ 123/197.4

FOREIGN PATENT DOCUMENTS 936514  2/1948  France ...................................... 74/45

WO92/10696  6/1992  WIPO ........................................ 74/45

Primary Examiner—Allan D. Herrmann

[57] ABSTRACT

An engine for generating rotational torque through the oscillating movement of lever arms. The inventive device includes an elongated cylinder having first and second opposed cylinder heads. A pair of pistons are oppositely disposed within the cylinder and coupled together by a connecting rod. At least one lever arm is pivotally mounted at a first end thereof to the connecting rod between the pistons. The lever arm is also pivotally mounted at a medial portion thereof exterior of the cylinder to a mounting plate. A flywheel is rotatable mounted to the mounting plate and engages a second end of the lever arm, whereby oscillation of the lever arm in response to piston movement is translated into rotational movement of the flywheel.

5 Claims, 6 Drawing Sheets

OSCILLATION LEVER ARM ENGINE

BACKGROUND OF THE INVENTION

1. Field of the Invention

The present invention relates to internal combustion engine structures and more particularly pertains to an oscillating lever arm engine for generating rotation torque through the oscillating movement of lever arms.

2. Description of the Prior Art

The use of internal combustion engine structures is known in the prior art. More specifically, internal combustion engine structures heretofore devised and utilized are known to consist basically of familiar, expected and obvious structural configurations, notwithstanding the myriad of designs encompassed by the crowded prior art which have been developed for the fulfillment of countless objectives and requirements.

Known prior art internal combustion engine structures include U.S. Pat. No. 5,255,572; U.S. Pat. No. 5,113,808; U.S. Pat. No. 5,067,456; U.S. Pat. 5,060,609; and U.S. Pat. No. 4,352,343.

While these devices fulfill their respective, particular objectives and requirements, the aforementioned patents do not disclose an oscillating lever arm engine for generating rotational torque through the oscillating movement of lever arms which includes an elongated cylinder having a pair of pistons oppositely disposed within the cylinder and coupled together by a connecting rod with at least one lever arm pivotally mounted to the connecting rod between the pistons and also pivotally mounted at a medial portion thereof the exterior cylinder, wherein oscillating of the lever arm in response to the piston movement is translated into rotational movement of an adjacent flywheel.

In these respects, the oscillating lever arm engine according to the present invention substantially departs from the conventional concepts and designs of the prior art, and in so doing provides an apparatus primarily developed for the purpose of generating rotational torque through the oscillating movement of at least one lever arm.

SUMMARY OF THE INVENTION

In view of the foregoing disadvantages inherent in the known types of internal combustion engine structures now present in the prior art, the present invention provides a new oscillating lever arm engine construction wherein the same can be utilized for generating rotational torque through the oscillating movement of lever arms. As such, the general purpose of the present invention, which will be described subsequently in greater detail, is to provide a new oscillating lever arm engine apparatus and method which has many of the advantages of the internal combustion engine structures mentioned heretofore and many novel features that result in an oscillating lever arm engine which is not anticipated, rendered obvious, suggested, or even implied by any of the prior art internal combustion engine structures, either alone or in any combination thereof.

To attain this, the present invention generally comprises an engine for generating rotational torque through the oscillating movement of lever arms. The inventive device includes an elongated cylinder having first and second opposed cylinder heads. A pair of pistons are oppositely disposed within the cylinder and coupled together by a connecting rod. At least one lever arm is pivotally mounted at a first end thereof to the connecting rod between the pistons. The lever arm is also pivotally mounted at a medial portion thereof exterior of the cylinder to a mounting plate. A flywheel is rotatable mounted to the mounting plate and engages a second end of the lever arm, whereby oscillation of the lever arm in response to piston movement is translated into rotational movement of the flywheel.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new oscillating lever arm engine apparatus and method which has many of the advantages of the internal combustion engine structures mentioned heretofore and many novel features that result in a oscillating lever arm engine which is not anticipated, rendered obvious, suggested, or even implied by any of the prior art internal combustion engine structures, either alone or in any combination thereof.

It is another object of the present invention to provide a new oscillating lever arm engine which may be easily and efficiently manufactured and marketed.

It is a further object of the present invention to provide a new oscillating lever arm engine which is of a durable and reliable construction.

An even further object of the present invention is to provide a new oscillating lever arm engine which is susceptible of a low cost of manufacture with regard to both materials and labor, and which accordingly is then susceptible of low prices of sale to the consuming public, thereby making such oscillating lever arm engines economically available to the buying public.

Still yet another object of the present invention is to provide a new oscillating lever arm engine which provides in the apparatuses and methods of the prior art some of the advantages thereof, while simultaneously overcoming some of the disadvantages normally associated therewith.

Still another object of the present invention is to provide a new oscillating lever arm engine for generating rotational torque through the oscillating movement of a pair of lever arms.

Yet another object of the present invention is to provide a new oscillating lever arm engine which includes an elongated cylinder having a pair of pistons oppositely disposed within the cylinder and coupled together by a connecting rod with at least one lever arm pivotally mounted to the connecting rod between the pistons and also pivotally mounted at a medial portion thereof the exterior cylinder, wherein oscillation of the lever arm in response to the piston movement is translated into rotational movement of an adjacent flywheel.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
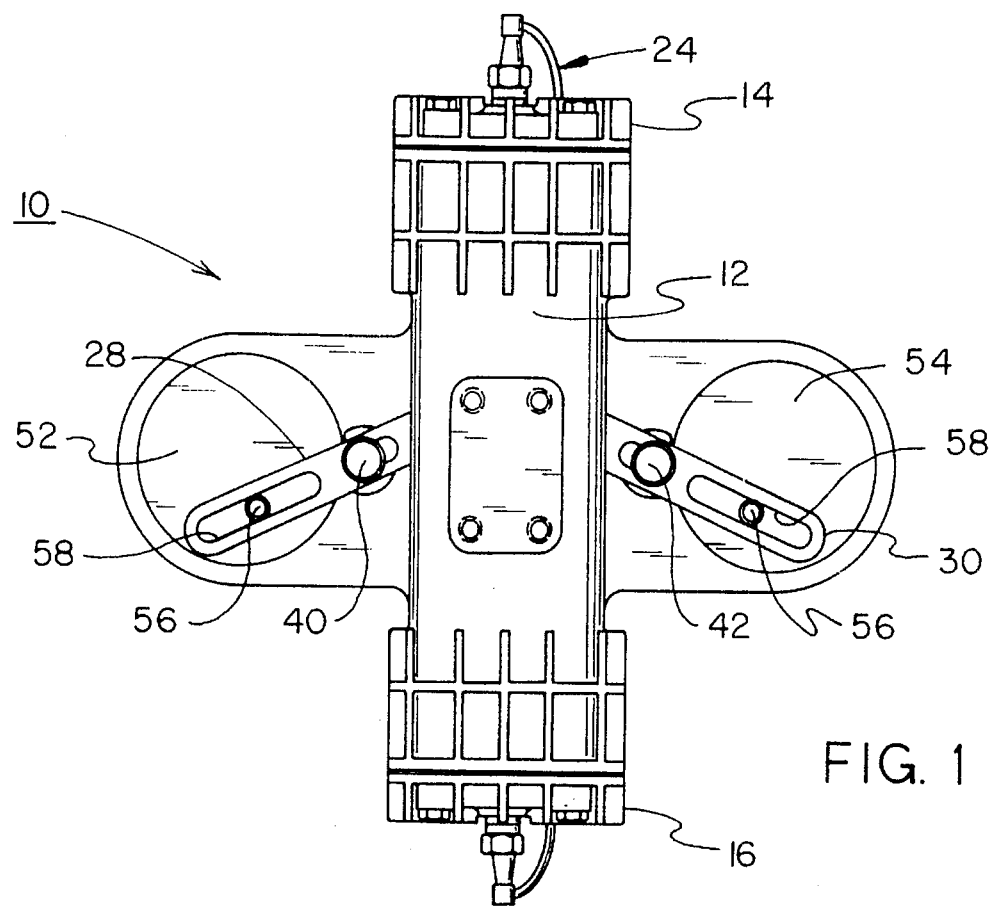
FIG. 1 is a rear elevation view of a oscillating lever arm engine according to the present invention.

With reference now to the drawings, and in particular to FIGS. 1–12 thereof, a new oscillating lever arm engine embodying the principles and concepts of the present invention and generally designated by the reference numeral 10 will be described.

Figure 3:
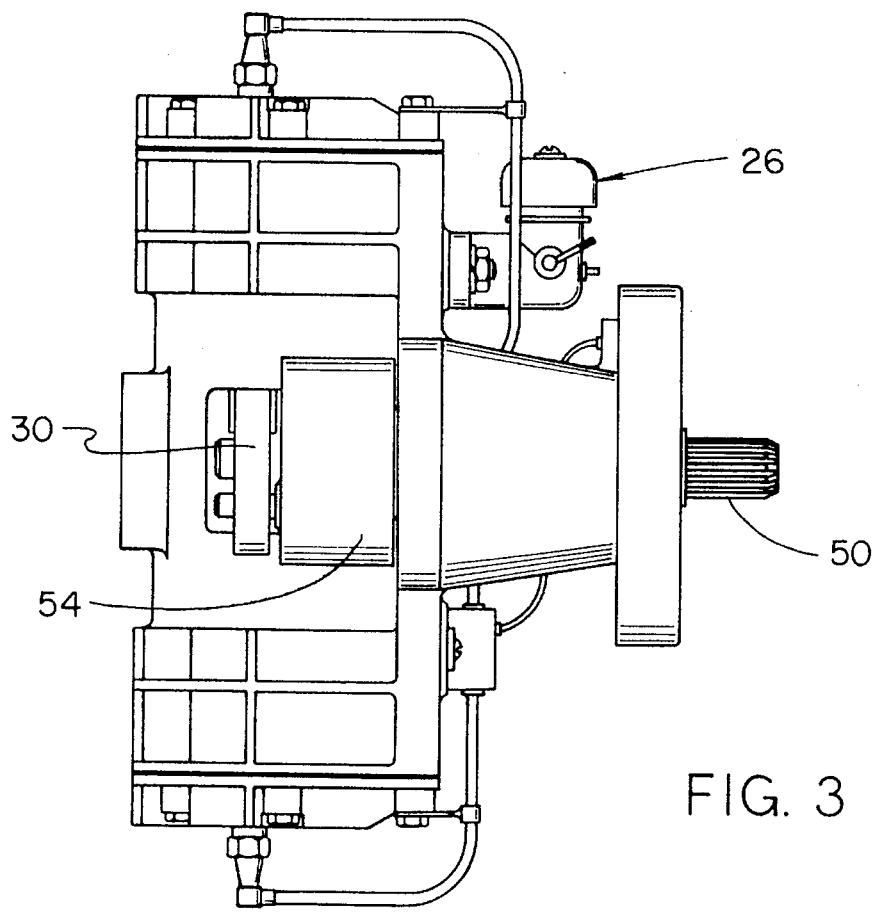
FIG. 3 is a side elevation view of the invention.
Figure 5:
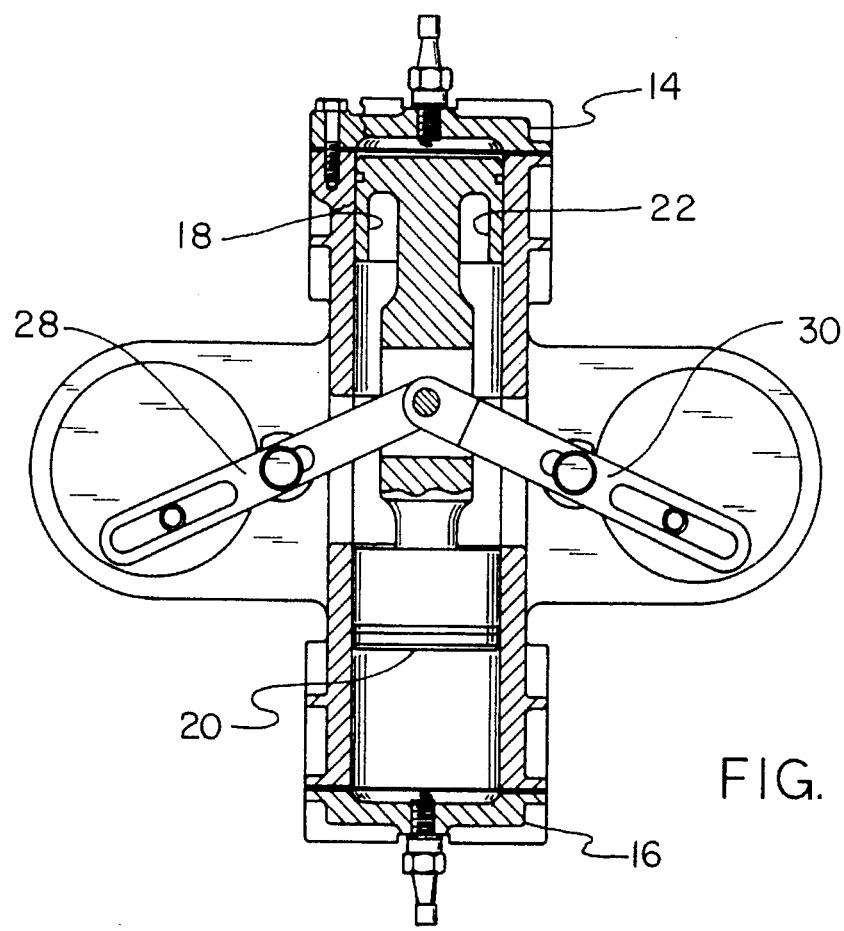
FIG. 5 is a rear elevation view, partially in cross section, of the engine.
Figure 6:
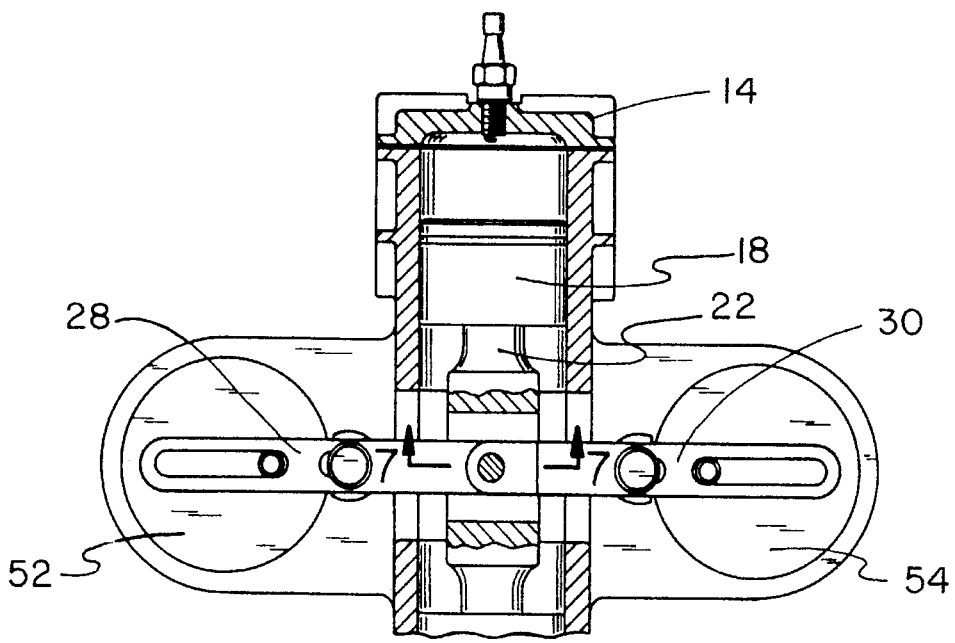
FIG. 6 is a further rear elevation view, partially in cross section, of the engine.

More specifically, it will be noted that the oscillating lever arm engine 10 comprises an elongated cylinder 12 having a hollow cylindrical interior. A first cylinder head 14 is sealingly coupled to a first end of the elongated cylinder, with a second cylinder head 16 being similarly sealingly engaged to a second end of the elongated cylinder, as shown in FIG. 1. The first piston 18, as shown in FIG. 5, is movably mounted within the elongated cylinder 12 and positioned so as to compress a fuel and air mixture against an interior surface of the first cylinder head 14. Similarly, a second piston 20 is movably disposed within the elongated cylinder 12 and positioned so as to compress a fuel and air mixture against the second cylinder head 16. The pistons 18, 20 are coupled together by a connecting rod 22 extending therebetween such that a positioning of the first piston into a top dead center orientation, as illustrated in FIG. 5, will position the second piston into a bottom dead center orientation. Conventional ignition means 24 are provided for igniting a fuel and air mixture within the elongated cylinder 12 proximal to each one of the cylinder heads 14, 16. As shown in FIG. 3, a carburetor means 26 is provided for generating a fuel-air mixture and transmitting such mixture into the cylinder 12 between the pistons 18, 20 and the respective cylinder heads 14, 16. The carburetor means 26 communicates with the elongated cylinder 12 through unillustrated conventional valve structure, such as mechanically oscillated valves, electrically oscillated valves, reed valves, or the like which communicate with the cylinders through conventional manifold structure absent from the drawing but conventionally know in the art. By this structure, the pistons 18, 20 will reciprocate back and forth within the elongated cylinder 12 during operation of the engine 10.

Figure 7:
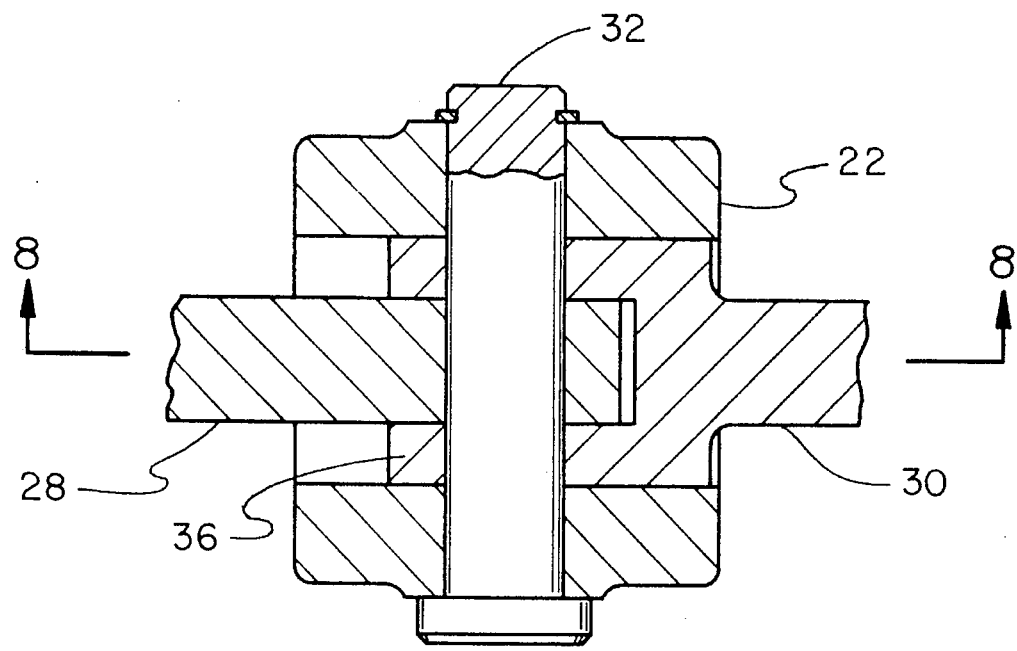
FIG. 7 is a cross sectional view taken along line 7—7 of FIG. 6.
Figure 8:
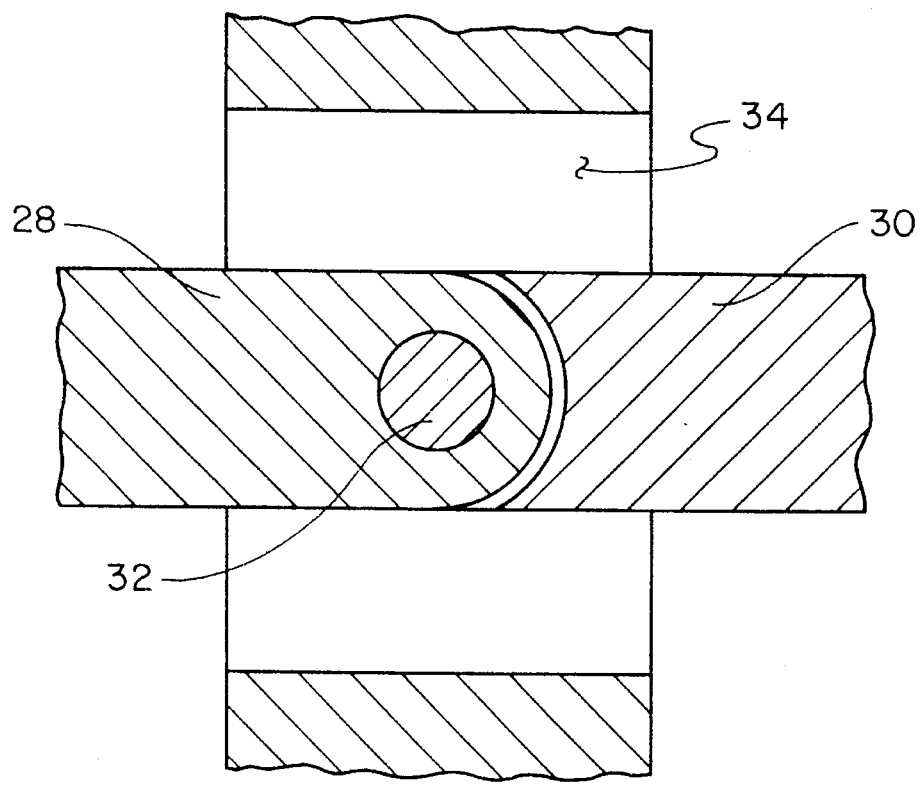
FIG. 8 is a further cross sectional view taken along line 8—8 of FIG. 7.

To extract rotational torque from the reciprocating movement of the pistons 18, 20, at least one lever arm is provided. Preferably, the present invention 10 includes a first lever arm 28 and a second lever arm 30 which are pivotally mounted to a center of the connecting rod 22 by a connecting rod pivot pin 32. To this end, the connecting rod 22 includes a center cavity 34 extending transversely therethrough which receives first ends of the lever arms 28, 30. The first lever arm 28 extends into a forked end 36 of the second lever arm 30, with the connecting rod pivot pin 32 extending through both the forked end 36 of the second lever arm 30 and the first lever arm 28, as best illustrated in FIG. 7 and 8.

The lever arms 28, 30 project exteriorly of the elongated cylinder 12 and are pivotally mounted to a mounting plate 38 extending across and oriented substantially orthogonal to a longitudinal length of the elongated cylinder 12. The mounting plate 38 is integrally or otherwise fixedly secured to the elongated cylinder 12 and is provided with a plurality of unlabeled threaded apertures which permit mounting of the engine 10 to a vehicle or other structure. The lever arms 28, 30 project in opposed directions from a plurality of unlabeled slots in the side wall of the elongated cylinder 12 and are pivotally mounted to the mounting plate 38 by a first pivot pin 40 and a second pivot pin 42, respectively. The lever arms 28, 30 each include pivot slots 31 extending through a medial portion thereof which permit a passage of the pivot pins 40, 42 therethrough to pivotally and movably mount the lever arms to the mounting plate.

Figure 2:
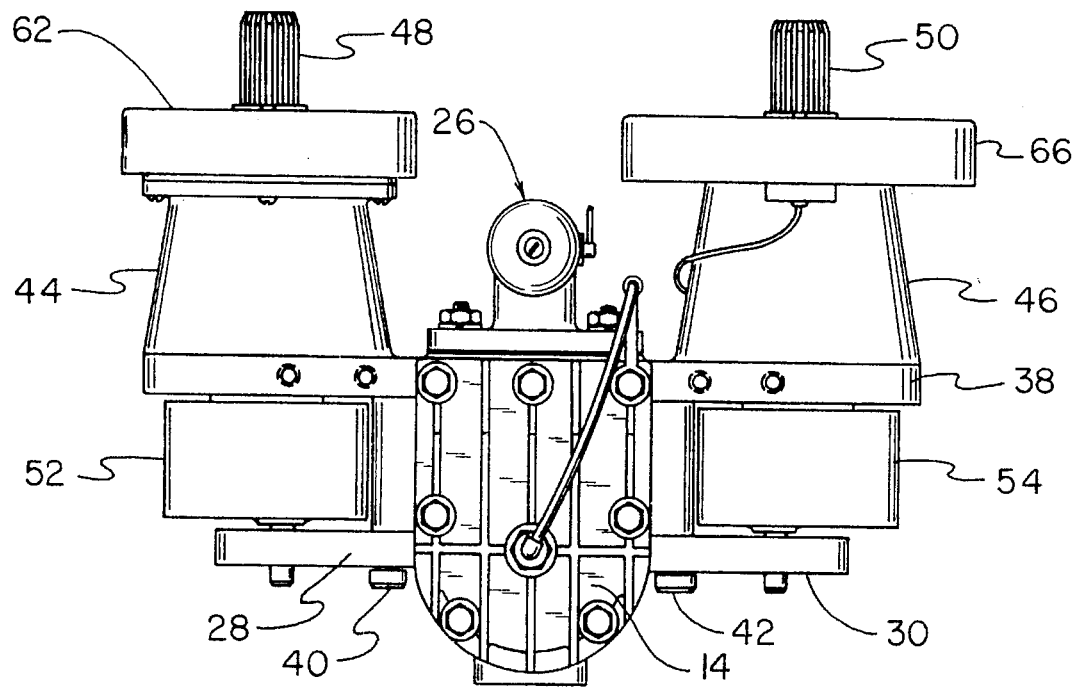
FIG. 2 is a top plan view thereof.

As best illustrated in FIG. 2, a first shaft support 44 and a second shaft support 46 project from the mounting plate 38 and serve to rotatable mount a first output shaft 48 and a second output shaft 50 extending therethrough, respectively. Further, a first flywheel 52 and a second flywheel 54 are mounted to the first and second output shafts 48, 50, respectively, on opposed sides of the mounting plate 38 relative to the shaft supports 44, 46. Each of the flywheels 52, 54 includes a projection 56 which extends into an elongated slot 58 formed in a second end of each of the respective lever arms 28, 30. By this structure, a sliding movement of the pistons 18, 20 within the cylinder 12 will be translated into a pivoting oscillation of the lever arms 28, 30 and subsequently into a rotational movement of the flywheels 52, 54 which are coupled to the output shafts 48, 50. Thus, rotational torque can be extracted from the output shafts 48, 50 to accomplish useful work.

Figure 4:
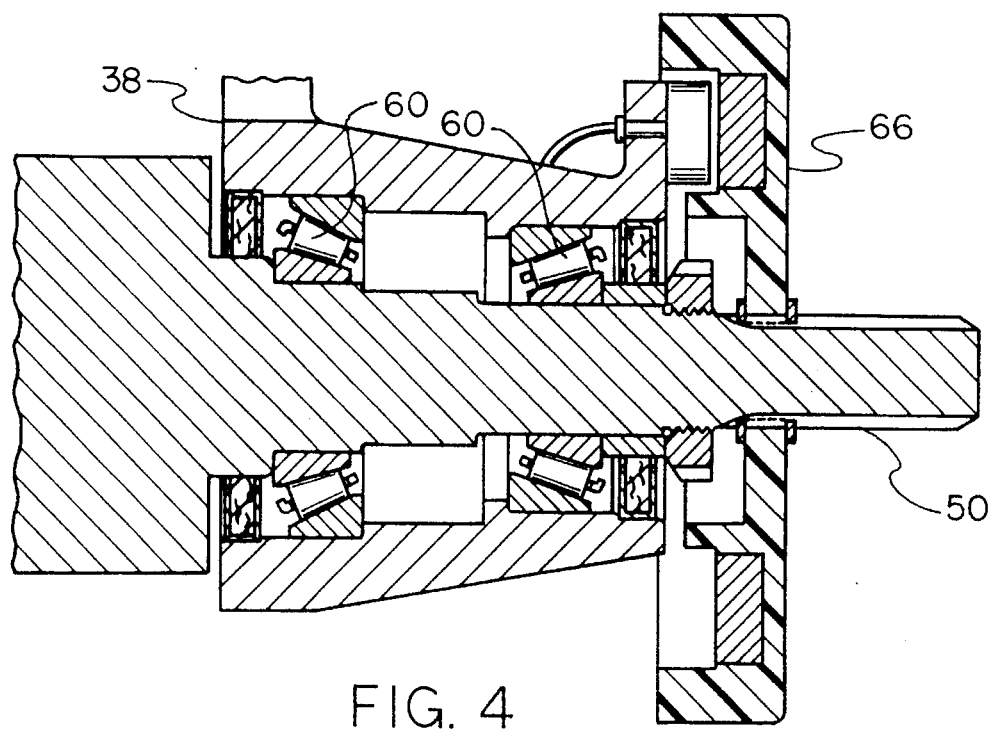
FIG. 4 is a cross sectional view of a portion of the present invention.

As shown in FIG. 4 for the second output shaft 50, each of the shafts 48, 50 is rotatably supported within the respective shafts support 44, 46 by a plurality of roller bearings 60. As shown in FIG. 4, a magneto assembly 66 and 62 can be provided and coupled to the second output shaft 50 to generate electrical power for the ignition means 24 and other accessories.

In use, the oscillating lever arm engine 10 generates rotational torque through the output shafts 48, 50 from the oscillating motion of the opposed pistons 18, 20. Because of the slidable and moveable connection between the lever arms 28, 30 and the respective flywheels 52, 54, the output shafts 48, 50 can rotate in any desired direction during operation of the engine. In other words, imparting an initial rotational movement to the output shafts 48, 50 in a desired direction will result in a continuing movement or rotation of the shaft in this direction. Thus, the present invention 10 can provide for the shafts rotating in similar directions or opposite directions, as desired. Further, upon a stopping of the engine 10 the rotational direction of the output shafts 48, 50 can easily be altered.

Figure 9:
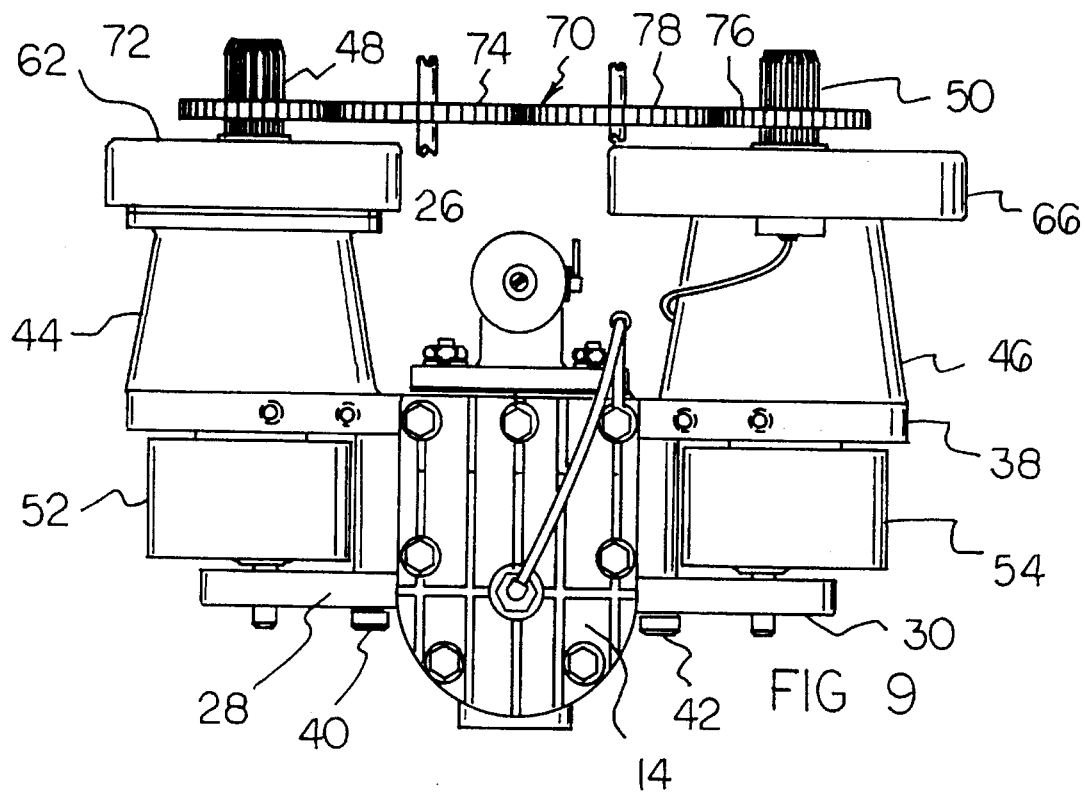
FIG. 9 is a top plan view of the engine including a matching gear train.
Figure 10:
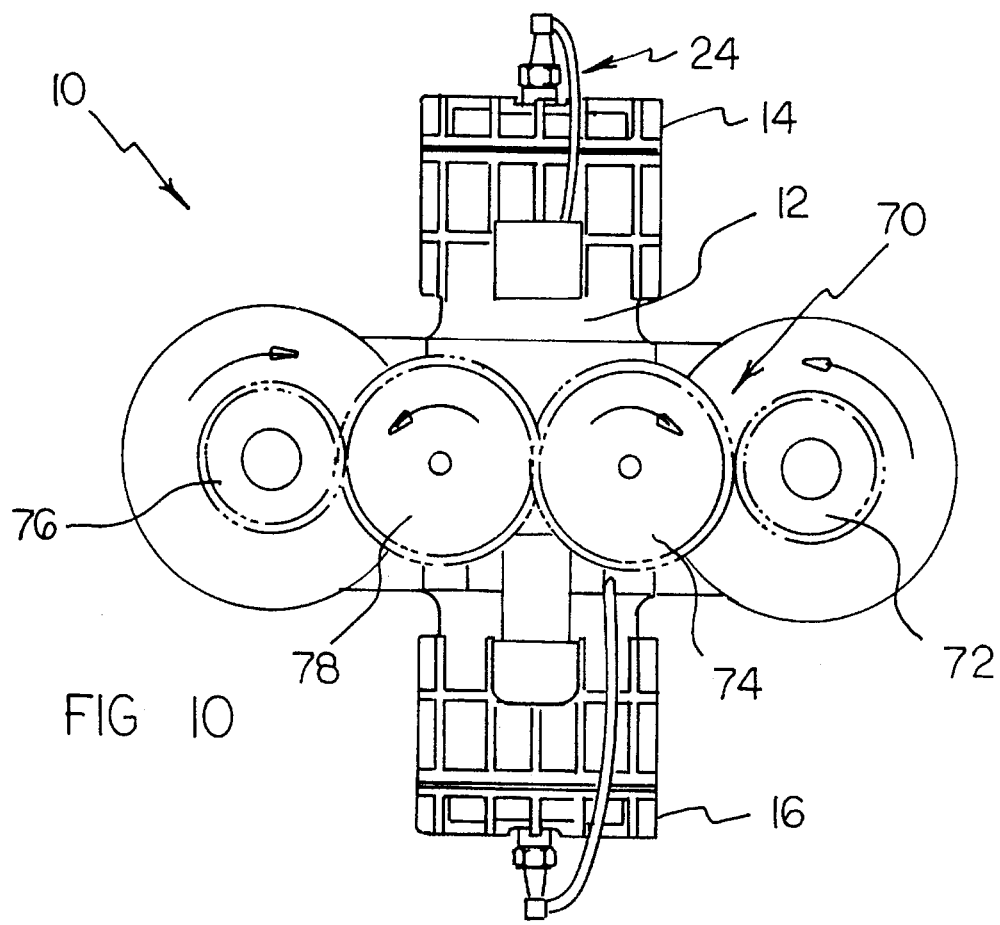
FIG. 10 is a front elevational view of the engine including the matching gear train.

Turning now to FIGS. 9 and 10, it can be shown that the present invention may additionally include a matching gear train means 70 for mechanically coupling the output shafts 48 and 50 together such that the first shaft rotates in a predetermined direction relative to a rotation of the second shaft 50. To this end, a first shaft gear 72 is mounted to the first output shaft 48 so as to rotate therewith. A first intermediate gear 74 is rotatably mounted proximal to the first shaft gear and positioned in mesh therewith. A second shaft gear 76 is mounted to the second output shaft 50 so as to rotate therewith, with a second intermediate gear 78 being rotatably mounted proximal to the second shaft gear and positioned in mesh therewith. The intermediate gears 74 and 78 can be rotatably supported by unlabeled shafts coupled to a portion of the engine or surrounding structure to which the engine is also mounted. By this structure, the output shafts rotate in a predetermined direction relative to one another.

Figure 11:
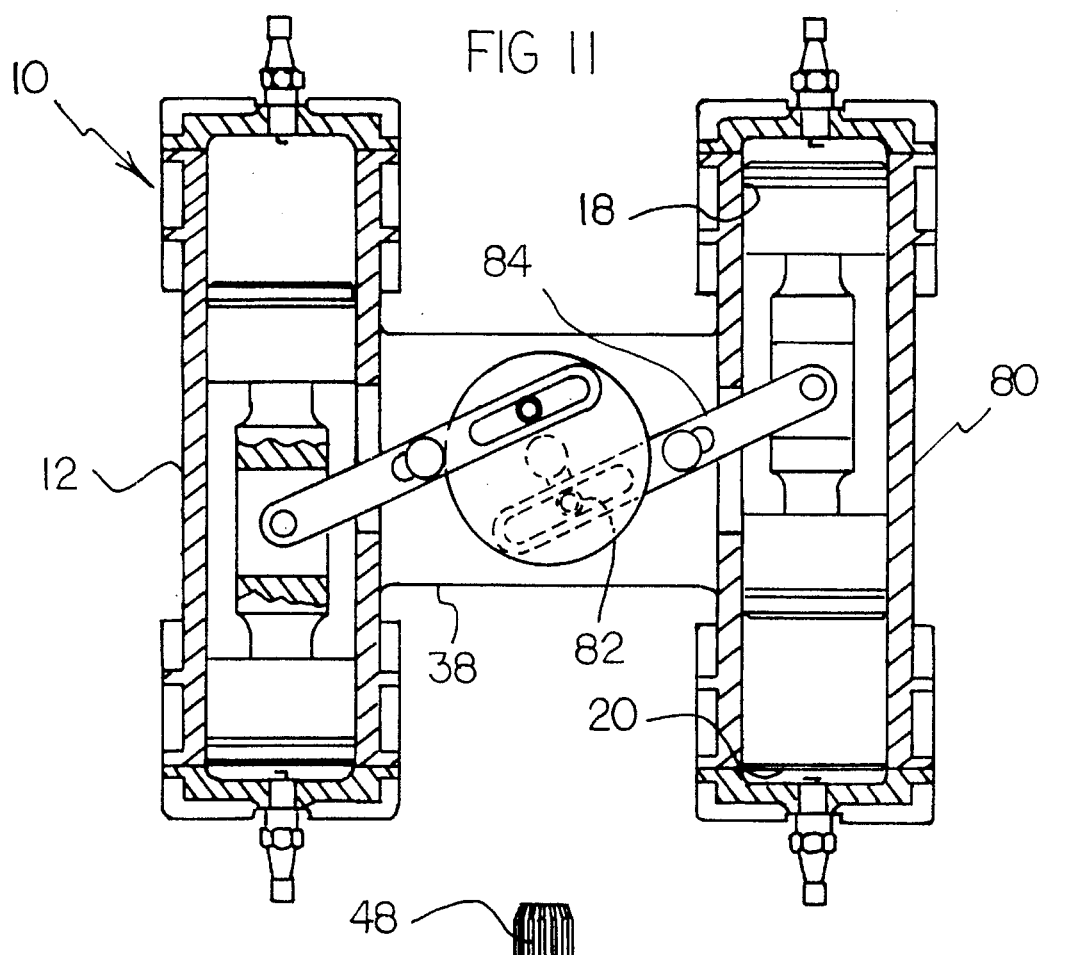
FIG. 11 is a cross sectional view of an alternative form of the present invention.
Figure 12:
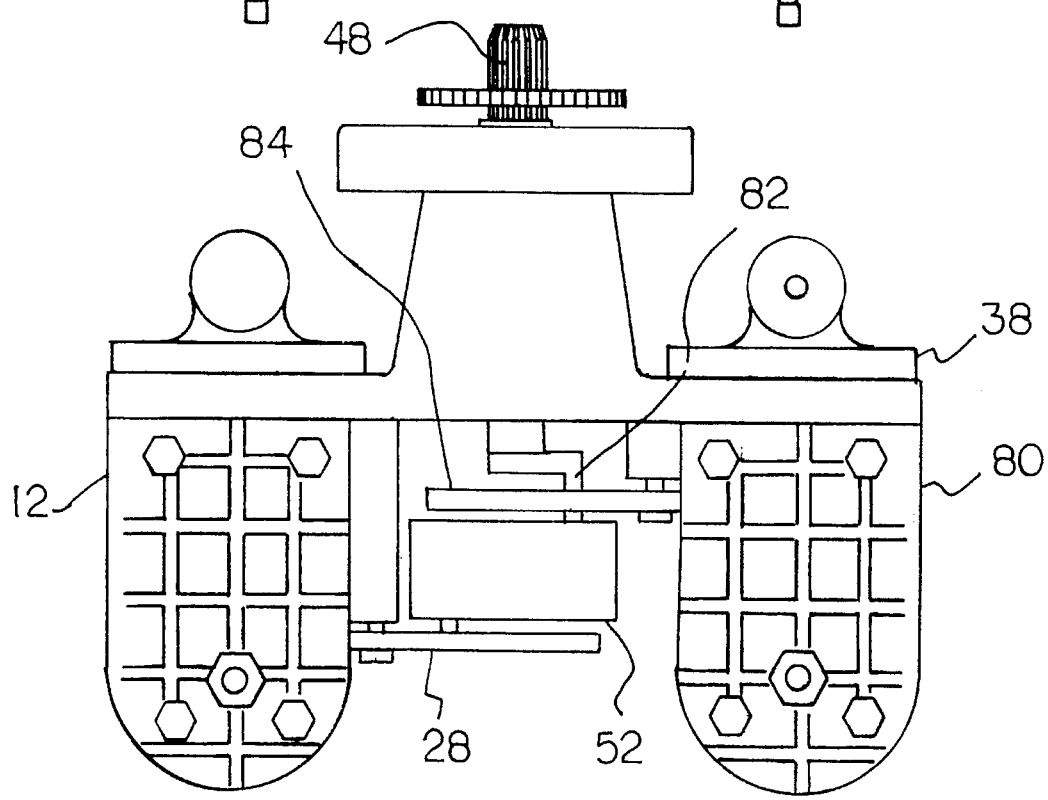
FIG. 12 is a top plan view of the alternative form of the invention.

An alternative form of the present invention is illustrated in FIGS. 11 and 12, and it can be shown from these figures that the present invention 10 may comprise a second cylinder 80 including all of the components from the first elongated cylinder 12, whereby a total of four pistons are present within the engine 10. The cylinders 12 and 80 are coupled together by the mounting plate 38, which rotatably supports only the first output shaft 48. The first flywheel 52 is coupled to the first output shaft by a crank 82. As shown in FIG. 12, the lever arm 28 of the first cylinder 12 engages the rear of the flywheel 52, with the second lever arm 84 of the second cylinder 80 engaging a front of the flywheel and being coupled to the crank 82. By this structure, oscillating motion of the lever arms 28 and 84 effects rotation of the first flywheel 52 in a desired direction.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An oscillating lever arm engine comprising:

an elongated cylinder having a hollow cylindrical interior;

a mounting plate fixedly secured to said elongated orthogonally to a longitudinal length of said elongated cylinder;

a first cylinder head sealingly coupled to a first end of said elongated cylinder, and a second cylinder head sealingly coupled to a second end of said elongated cylinder;

a first piston movably mounted within said elongated cylinder, and a second piston movably disposed within said elongated cylinder and positioned in an opposed direction relative to said first piston;

a connecting rod extending between said first and second piston;

a first output shaft rotatably mounted to said mounting plate;

a first flywheel mounted to said first output shaft;

a first lever arm pivotally mounted at a first end thereof to said connecting rod and projecting exteriorly of said cylinder, said first lever arm being pivotally mounted at a medial portion thereof to said mounting plate, said first lever arm being movably coupled at a second end thereof to said first flywheel such that an oscillating movement of said first lever arm imparts a rotational motion to said first flywheel;

a second output shaft rotatably mounted to said mounting plate; and a second flywheel mounted to said second output shaft; and a second lever arm pivotally mounted at a first end thereof to said connecting rod and projecting exteriorly of said cylinder, said second lever arm being mounted at a medial portion thereof to said mounting plate, said second lever arm being movably coupled at a second end thereof to said second flywheel such that an oscillating movement of said second lever arm imparts a rotational motion to said second flywheel.

2. The oscillating lever arm engine of claim 1, wherein said connecting rod includes a center cavity extending transversely there through which receives said first ends of said lever arms, said first end of said second lever arm being shaped so as to define a forked end with said first lever arm extending into said forked end of said second lever arm; and a connecting rod pivot pin extending through said connecting rod, said forked end of said second lever arm, and said first lever arm.

3. The oscillating lever arm engine of claim 2, wherein said lever arms project in opposed directions from a plurality of slots in a side wall of said elongated cylinder.

4. The oscillating lever arm engine of claim 3, and further comprising a first shaft support and a second shaft support projecting from said mounting plate for rotatably mounting said first output shaft and said second output shaft.

5. The oscillating lever arm engine of claim 4, and further comprising:

a second elongated cylinder having a hollow cylindrical interior, said mounting plate being fixedly secured to said second elongated cylinder orthogonally to a longitudinal length of said second elongated cylinder;

a first cylinder head sealingly coupled to a first end of said second elongated cylinder, and a second cylinder head sealingly coupled to a second end of said second elongated cylinder;

a first piston movably mounted within said second elongated cylinder, and a second piston movably disposed within said second elongated cylinder and positioned in an opposed direction relative to said first piston of said second elongated cylinder;

a connecting rod extending between said first and second piston within said second elongated cylinder;

a crank interposed between said first output shaft rotatably mounted to said mounting plate and said first flywheel;

a second lever arm pivotally mounted at a first end thereof to said connecting rod and projecting exteriorly of said second cylinder, said second lever arm being pivotally mounted at a medial portion thereof to said mounting plate, said second lever arm being movably coupled at a second end thereof to said crank such that an oscillating movement of said second lever arm imparts a rotational motion to said first flywheel.

\* \* \* \* \*